United States Patent [19]
Hrovat et al.

[11] Patent Number: 5,471,386
[45] Date of Patent: Nov. 28, 1995

[54] VEHICLE TRACTION CONTROLLER WITH TORQUE AND SLIP CONTROL

[75] Inventors: Davorin Hrovat, Dearborn; Jahanbakhsh Asgari, Detroit; Michael G. Fodor, Taylor, all of Mich.

[73] Assignee: Ford Motor Company, Dearborn, Mich.

[21] Appl. No.: 316,760

[22] Filed: Oct. 3, 1994

[51] Int. Cl.[6] ........................................ B60T 8/66
[52] U.S. Cl. .............. 364/426.02; 364/426.03; 364/426.01; 180/197
[58] Field of Search .................. 364/426.01, 426.02, 364/426.03; 303/113.2, 104, 97, 112, 21 A; 180/104, 140, 197

[56] References Cited

U.S. PATENT DOCUMENTS

| | | | |
|---|---|---|---|
| 3,632,176 | 1/1972 | Gaeke | 303/21 A |
| 3,752,251 | 8/1973 | Gaeke | 180/104 |
| 4,453,781 | 6/1984 | Poggie | 303/112 |
| 4,873,639 | 10/1989 | Sato et al. | 364/426.02 |
| 4,998,593 | 3/1991 | Karnopp et al. | 180/140 |
| 5,019,984 | 5/1991 | Masaki et al. | 364/426.02 |
| 5,043,896 | 8/1991 | Sol | 364/426.02 |
| 5,089,967 | 2/1992 | Haseda et al. | 364/426.02 |
| 5,132,906 | 7/1992 | Sol et al. | 364/426.02 |
| 5,155,686 | 10/1992 | Shiraishi et al. | 364/426.03 |
| 5,159,990 | 11/1992 | Abe et al. | 180/197 |
| 5,172,319 | 12/1992 | Shiraishi et al. | 364/426.03 |
| 5,181,175 | 1/1993 | Shiraishi et al. | 364/426.03 |
| 5,195,808 | 3/1993 | Johnsen | 303/113.2 |
| 5,249,851 | 10/1993 | Johnsen | 303/104 |
| 5,278,761 | 1/1994 | Ander et al. | 364/426.03 |
| 5,282,138 | 1/1994 | Sano | 364/426.03 |
| 5,311,433 | 5/1994 | Igata et al. | 364/426.01 |
| 5,325,300 | 6/1994 | Tsuyama et al. | 364/426.03 |
| 5,341,296 | 8/1994 | Yasuno et al. | 364/426.01 |
| 5,351,192 | 9/1994 | Tsuyama et al. | 364/426.03 |
| 5,364,175 | 11/1994 | Sakane et al. | 303/97 |
| 5,365,443 | 11/1994 | Tsuyama et al. | 364/426.03 |

OTHER PUBLICATIONS

Matsumoto et al., "Improvement of Vehicle Dynamics Through Braking Force Distribution Control", SAE Paper 920645.

*Primary Examiner*—Kevin J. Teska
*Assistant Examiner*—Russell W. Frejd
*Attorney, Agent, or Firm*—Alan J. Lippa; Roger L. May

[57] ABSTRACT

A vehicle traction controller controls vehicle traction and directional stability by determining the rotational velocity of the vehicle. The rotational velocity of the vehicle is measured and compared to a predefined range. If the rotational velocity is outside of the predefined range, then a wheel torque value, which is indicative of a braking force to be applied independently of driver initated braking, is generated for each wheel which is on a side of the vehicle as determined by the rotational velocity. The wheel torque value is compared to a range of values, which is based on road surface friction, and altered if the wheel torque value is outside of the range of values. Wheel spin and skid control is employed to reduce wheel spin and skid.

11 Claims, 6 Drawing Sheets

VEHICLE TRACTION CONTROLLER WITH TORQUE AND SLIP CONTROL

FIELD OF THE INVENTION

The present invention relates generally to the field of vehicle traction control and more particularly to the use of a vehicle braking system to control vehicle traction.

BACKGROUND OF THE INVENTION

Those who drive vehicles on low traction surfaces such as roads covered with ice, snow, rain or loose gravel often have trouble controlling the behavior of the vehicle during turning or braking maneuvers because of the low coefficient of friction of such surfaces which substantially reduces the traction between the wheels and the road surface. As a result, application of the brakes or turning of the steering wheel can cause some or all of the wheels to skid. If the skid becomes severe, the vehicle can be difficult to control.

In recent years, anti-lock braking systems which operate during driver initiated braking to modulate the application of a braking force to all or some of the wheels of a vehicle to prevent wheel lockup have seen increased use. Other systems are known which operate during driver initiated braking to modulate the braking force applied independently of driver initiated braking to some or all of the wheels of a vehicle to improve vehicle stability while braking in a turn. Certain aspects of such a system are described by Shinji Matsumoto et al. in SAE Technical Paper Series No. 920645 entitled *Improvement of Vehicle Dynamics Through Braking Force Distribution Control.*

Anti-lock braking systems and systems of the type described by Matsumoto et al. operate during driver initiated braking to control vehicle stability. Other systems operate exclusively either in a torque control region or in a spin/skid control region to control vehicle stability. The applicants have discovered that on low traction surfaces, a selective combination of spin/skid control and torque control can lead to improved vehicle traction and stability.

SUMMARY OF THE INVENTION

It is an object of the present invention to improve vehicle traction by selectively applying a braking force to certain wheels of a vehicle on slippery roads, during turning or other conditions which can lead to wheel skidding.

According to a first aspect of the invention, the traction of one or more wheels of a vehicle being driven over a surface is controlled by generating a rotational velocity value indicative of the rotational velocity of the vehicle. A pair of wheels which are both on the same side of the vehicle and which are to be controlled by application of a braking force upon the wheels, are selected as a function of the rotational velocity value. The rotational velocity value is then compared to a predefined maximum value, and a wheel torque value which is indicative of a braking force to be applied to one of the first pair of wheels is generated if the rotational velocity value is greater than the predefined maximum value.

Use of the foregoing techniques offers a significant advantage in vehicle control on slippery surfaces by enhancing predictability and controllability of the vehicle during turns and emergency responses.

These and other features and advantages of the present invention may be better understood by considering the following detailed description of preferred embodiments of the invention. In the course of this description, reference will be made to the attached drawings.

DETAILED DESCRIPTION

Figure 1:
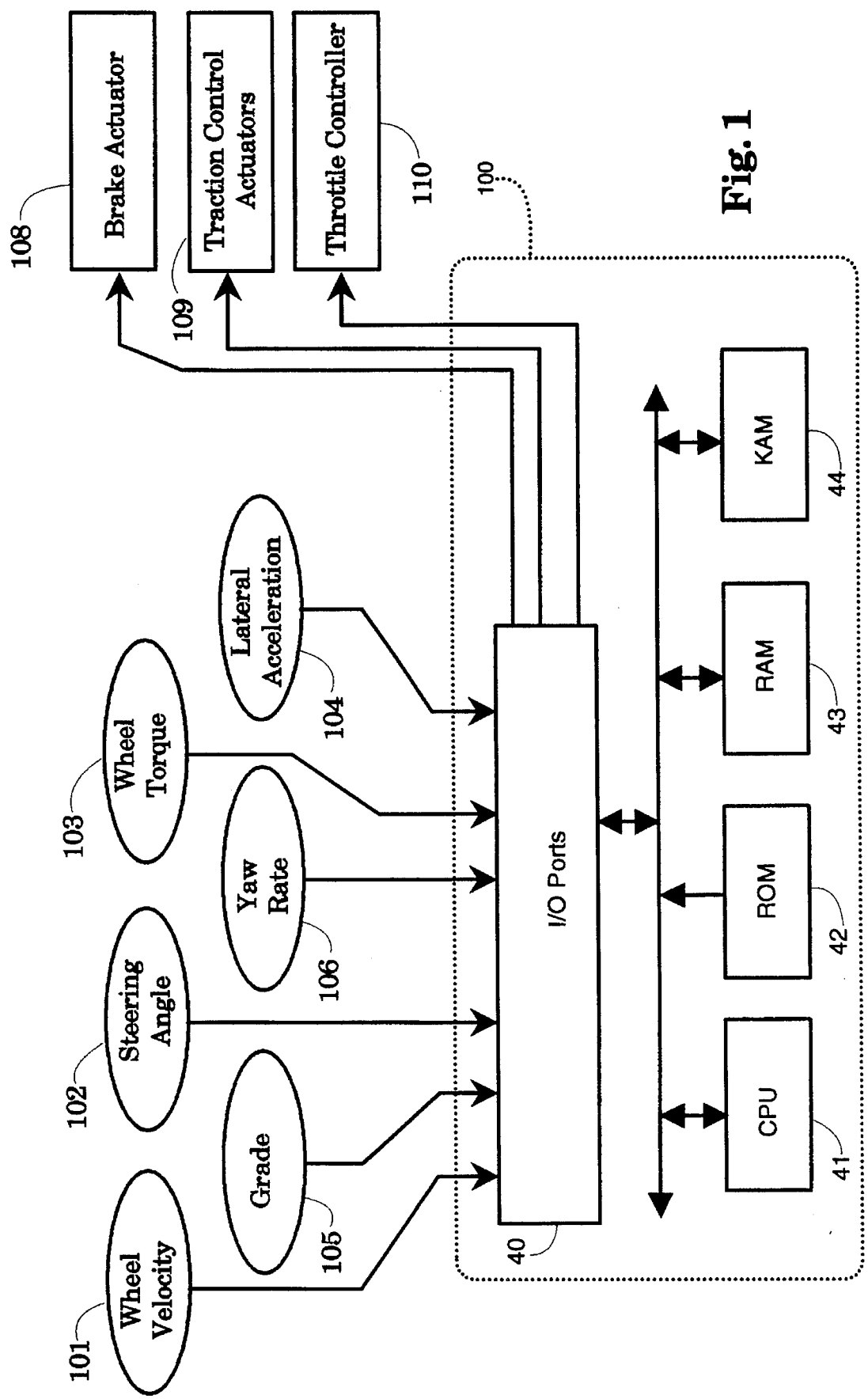
FIG. 1 is a schematic diagram of a system which embodies the principles of the invention.

In FIG. 1 an electronic controller 100 receives a plurality of signals and generates control signals to a plurality of controllers which operate to control various systems of a vehicle. Wheel velocity sensor seen at 101 takes the form of a Hall effect sensor and generates a signal which is indicative of the angular speed of an individual wheel of the vehicle. For convenience, only a single wheel velocity sensor has been shown at 101. However, in a preferred embodiment, a plurality of sensors of the type seen at 101 are positioned to generate a signal indicative of the angular speed of each of the driven wheels of the vehicle. A steering angle sensor 102 of known type provides a steering angle signal which is indicative of the steering angle through which a steering wheel (not shown) of the vehicle is moved. Wheel torque sensor 103 is of conventional type, such as a model manufactured by Lucas Schaevitz Company, and generates a signal indicative of the torque applied to a driven wheel of the vehicle to controller 100. In a preferred embodiment, a plurality of sensors of the type seen at 103 are positioned to generate a signal indicative of the torque applied to each of the driven wheels of the vehicle. Alternatively, the torque applied to each of the driven wheels of the vehicle may be estimated by a variety of known techniques. A preferred form of torque estimation is described in a pending U.S. application entitled "Robust Torque Estimation Using Multitudes of Models" assigned to the Ford Motor Company and filed in the names of Davorin Hrovat and Lee-Frei Chen on Nov. 12, 1992. Other torque estimation techniques are described in the following U.S. patents: U.S. Pat. No. 3,921,446 to Ludloff, U.S. Pat. No. 4,680,959 to Henry et al., U.S. Pat. No. 4,758,967 to Shmuter et al. and U.S. Pat. No. 4,985,838 to Hashiguchi et al.

Lateral acceleration sensor 104 takes the form of a conventional lateral accelerometer and generates a signal indicative of the lateral acceleration of the vehicle to controller 100. Grade sensor 105 takes the form of a conventional grade or level sensor and generates a signal indicative of the level of incline of the surface upon which the vehicle is being driven. Alternatively, the level of incline may be estimated using known techniques. Yaw rate sensor 106 is of known type and generates a signal indicative of the rotational velocity of the vehicle to controller 100. Alternatively, the rotational velocity of the vehicle may be estimated using known techniques. Controller 100 generates an estimated value of the coefficient of friction $\mu$ for the surface upon which the vehicle is travelling. Preferably, the value $\mu$ is estimated according to techniques described in U.S. Pat. No. 5,278,761.

Controller 100 generates control signals to brake steer controller 108, traction controller 109 and throttle controller 110. Brake actuator 108 operates to generate independent braking forces at appropriate wheels in response to one or more signals from module 100.

Traction controllers are shown generally at 109 and include systems which operate to modulate engine throttle, spark timing and braking forces. Traction controllers 109 preferably take a form as described in U.S. Pat. No. 5,278,761. In a preferred embodiment, throttle controller 110 is electronically controlled and operates to control the vehicle throttle position in response to driver inputs and electronically generated control inputs.

Controller 100 preferably comprises a microcomputer including a central processor unit (CPU) 41, input and output (I/O) port 40, read only memory (ROM) 42 for storing control programs, random access memory (RAM) 43, for temporary data storage which may also be used for counters or timers, keep-alive memory (KAM) 44 for long term storage of learned values, and a conventional data bus. Controller 100 operates under stored program control to receive the above described input signals, and to generate output signals to control the operation of controllers 108, 109 and 110.

Figure 2A:
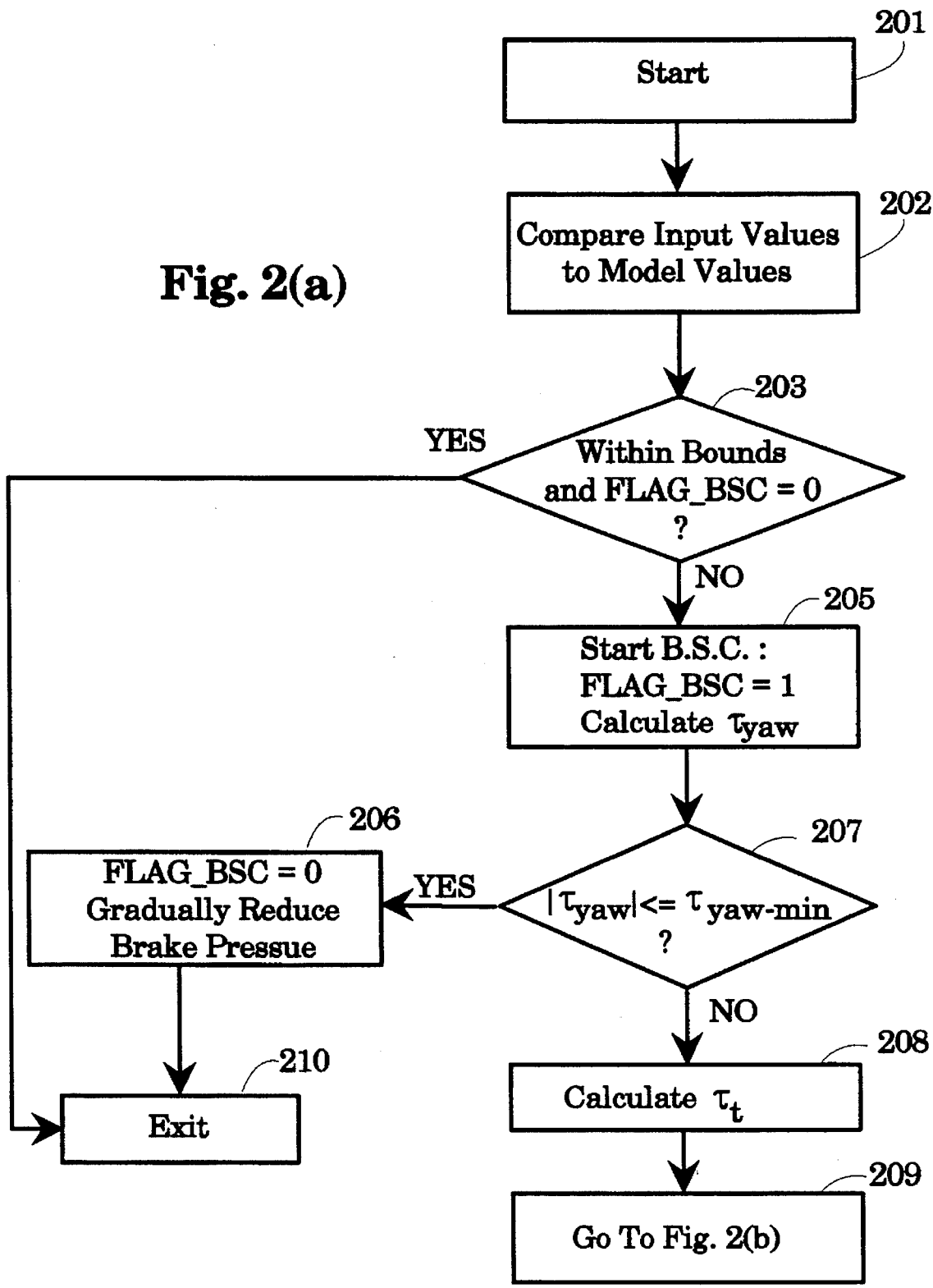
FIGS. 2(a), 2(b) and 2(c) are flow charts of a preferred embodiment.
Figure 2B:
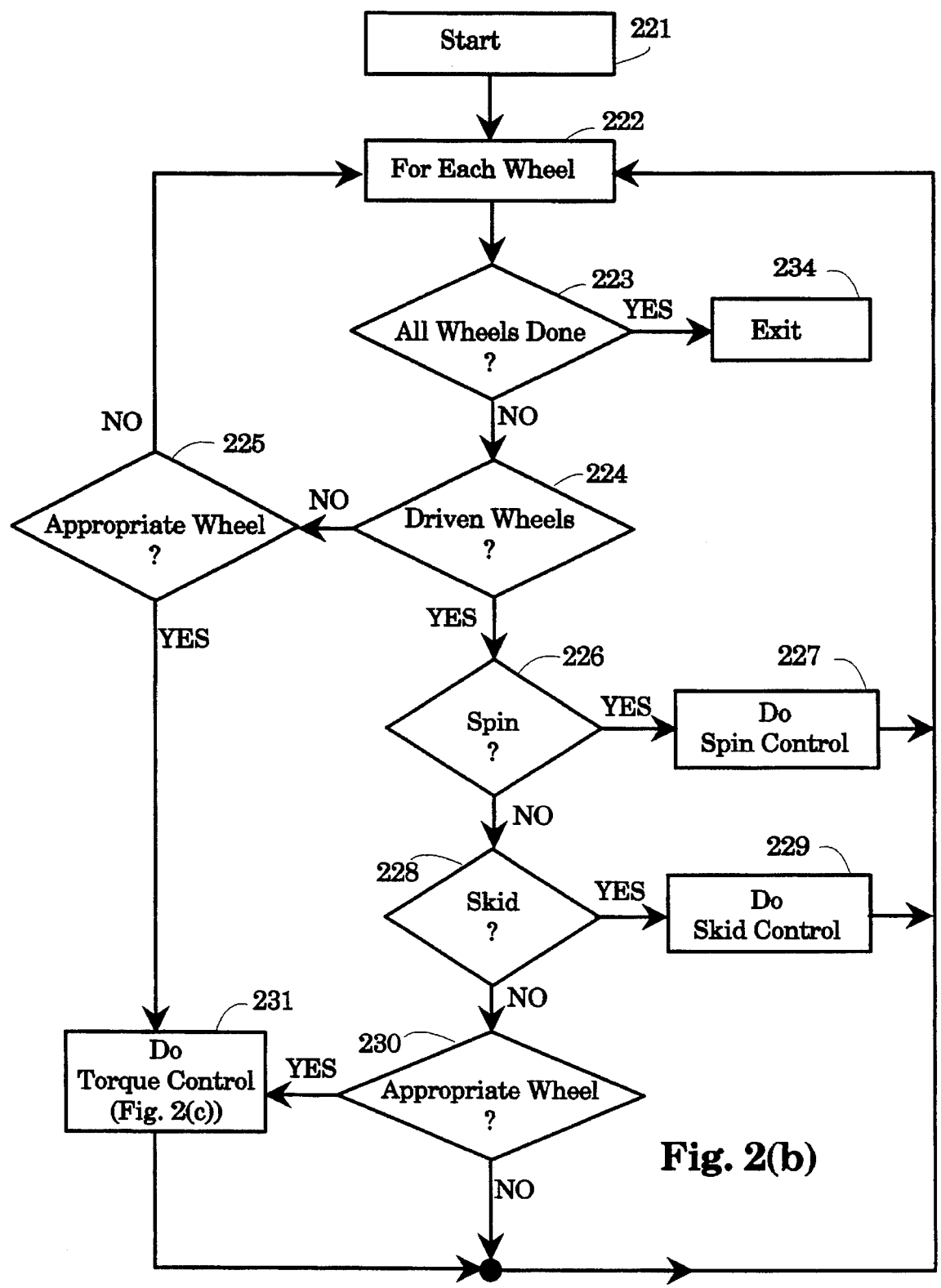
Figure 2C:
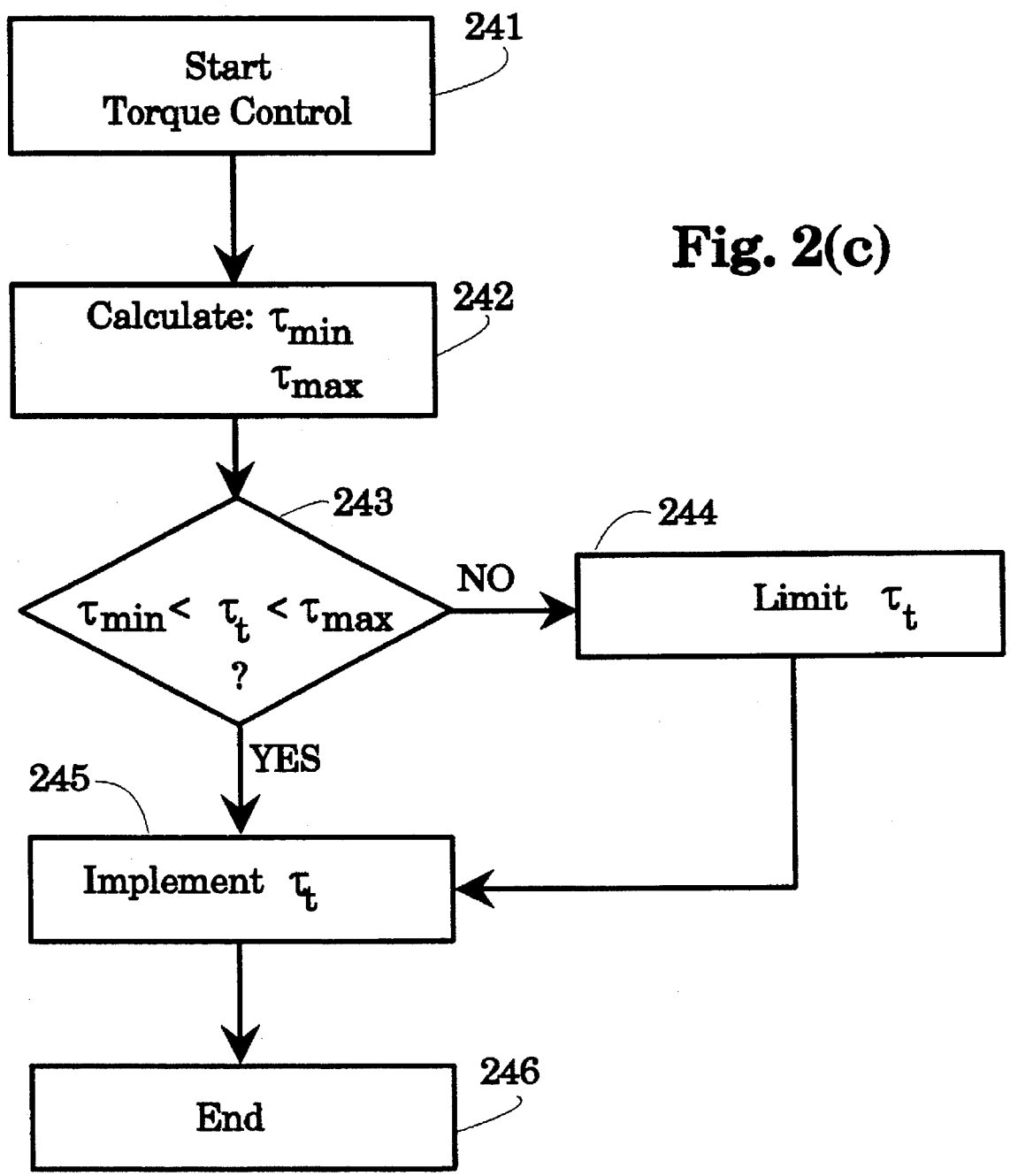

FIGS. 2(a), 2(b) and 2(c) are flowcharts showing the operation of a preferred embodiment of a brake steer control routine which operates independently of driver initiated braking to control the traction of the vehicle on low friction surfaces and in general emergency situations. The routine is initiated at 201 periodically while the vehicle is being driven. At 202 a brake steer control initiation check is performed to determine if conditions warrant the initiation of brake steer control. The check is advantageously performed by comparing the rotational velocity and lateral acceleration of the vehicle to corresponding predefined ranges. The predefined rotational velocity range and the predefined lateral acceleration range are preferably generated from a model of a coasting vehicle on a surface with a known coefficient of friction. Alternatively, the range may be generated from a high Mu model which is a model based on a road surface having a high coefficient of friction. The rotational velocity range and the lateral acceleration range may also be generated from a model which attempts to emulate four-wheel steering based on estimated coefficient of friction.

If either the rotational velocity value or the lateral acceleration value is outside of its corresponding predefined range then the brake steer control routine is continued. Otherwise, if at 203, both values are within bounds and FLAG_BSC equals zero, indicating that the vehicle is not under brake steer control, then the brake steer routine is exited at 210. Flag value FLAG_BSC advantageously indicates whether or not the vehicle is currently under brake steer control. A value of zero indicates that the vehicle is not under brake steer control and a value of one indicates that the vehicle is under brake steer control.

If FLAG_BSC equals 1 or if either the rotational velocity value or the lateral acceleration value are outside of their respective predefined ranges, then the brake steer control routine is initiated at 205 by setting FLAG_BSC equal to one, and calculating a vehicle torque value $\tau_{yaw}$ which is indicative of a torque required to be applied to the vehicle to bring the rotational velocity of the vehicle within a predefined range. At 207 the magnitude of vehicle torque value, designated as $|\tau_{yaw}|$ is compared to a predetermined minimum torque value $\tau_{yaw\text{-}min}$ and the routine is continued if $|\tau_{yaw}|$ is greater than $\tau_{yaw\text{-}min}$. If $|\tau_{yaw}|$ is less than or equal to $\tau_{yaw\text{-}min}$ then the routine proceeds to 206 where FLAG_BSC is set to a value of zero brake pressure applied to any of the wheels of the vehicle which is being applied by the brake steer control routine is gradually reduced. The comparison at 207 advantageously provides a second level of comparison to determine if the dynamics of the vehicle are such to require brake steer control. If the torque required to be applied to the vehicle to bring the rotational velocity of the vehicle within a predefined rotational velocity range is less than or equal to $\tau_{yaw\text{-}min}$ then brake steer control is exited.

At 208, a wheel torque value $\tau_t$ is calculated for each wheel of the vehicle and the routine proceeds to the steps shown in FIG. 2(b). Wheel torque value $\tau_t$ is indicative of a braking force to be applied to a particular wheel to produce the required $\tau_{yaw}$, and for single wheel braking is calculated by the following relationship:

$$\tau_t = \tau_t' - \tau_{yaw} * 2 \frac{R_t}{a}$$

where,
$\tau_t$ is a subsequent required wheel torque value, $\tau_t'$ is indicative of a current wheel torque value, $R_t$ is loaded wheel radius, and a is vehicle width.

As seen at steps 222, 223 and 224 in FIG. 2(b), the steps of FIGS. 2(b) and 2(c) are performed for each wheel of the vehicle after wheel torque value $\tau_t$ is calculated for each wheel at 208. At 222 a wheel is selected, and at 223 a check is made to determine if the steps of FIGS. 2(b) and 2(c) have been executed for each wheel. If so then the routine is exited at 234, and if not, then at 224, the selected wheel is checked to determine if it is a driven wheel. As used herein, the term driven wheel is understood to be a wheel which is powered by the engine of the vehicle. A preferred embodiment of the present invention advantageously performs spin control and skid control functions on driven wheels of the vehicle, as seen at 227 and 229, in addition to brake steer control functions on all wheels to enhance vehicle driveability.

If at 224 the selected wheel is found to be a non-driven wheel, then at 225, the selected wheel is checked to determine if it is on an appropriate side of the car to perform brake steer control. In a preferred embodiment, the appropriate side of the car for brake steer control is determined by whether vehicle torque value $\tau_{yaw}$ is a positive or negative number. A positive vehicle torque value indicates a first direction in which a torque needs to be applied to the vehicle to bring the rotational velocity of the vehicle into an acceptable range, while a negative vehicle torque value indicates a second direction which is opposite of the first direction. Assuming positive vehicle rotation in the clockwise direction, a positive vehicle torque value indicates that the pair of wheels on the right side of the vehicle are the appropriate wheels for application of a braking force, and a negative torque value indicates that the pair of wheels on the left of the vehicle are the appropriate wheels for application of a braking force.

If the selected wheel is not the appropriate wheel, then the routine returns to step 222 to select another wheel. If the selected wheel is an appropriate wheel then the routine proceeds to step 231 where a torque in the form of a braking force is applied to the selected wheel according to the steps shown in FIG. 2(c). Afterward, the routine proceeds to step 222.

If at 224, the selected wheel is determined to be a driven wheel, then at step 226 a test is perforated to determine if the wheel is spinning. As will be appreciated by those skilled in the art in view of the present disclosure, such a condition will occur when the driver of the vehicle is applying the throttle in an effort to accelerate the vehicle. If at 226, the selected wheel is determined to be spinning then a spin control procedure is performed at 227 to reduce spinning of the selected wheel. A preferred method of spin detection and control is described in U.S. Pat. No. 5,278,761 entitled *Method for Vehicular Wheel Spin Control that Adapts to Different Road Traction Characteristics*, which is assigned to the assignee of the present invention. After the spin control procedure is performed at 227, the routine proceeds to step 222.

If at 226, the selected wheel is found not to be spinning, then at 228 a test is performed to determine if the wheel is skidding. As will be appreciated by those skilled in the art in view of the present disclosure, such a condition will occur when the driver of the vehicle is applying the brake in an effort to decelerate the vehicle. If at 228, the selected wheel is determined to be skidding then a skid control procedure is performed at 229 to reduce spinning of the selected wheel. The skid control procedure at 229 is conventional and takes the form of a conventional antilock braking type system. After the skid control procedure is performed at 229, the routine proceeds to step 222.

If at 228, the selected wheel is found not to be skidding, then at steps 230 and steps 231 a procedure similar to steps 224 and 225 is performed on the selected driven wheel. If at 230, the selected wheel is not on the appropriate side of the vehicle for torque control then the routine proceeds to steps 222. In a vehicle equipped with an electronic throttle, torque may be increased to compensate for reduced vehicle speed due to the application of braking forces generated by the brake steer control routine before proceeding to step 222.

FIG. 2(c) shows the steps taken by a preferred embodiment to implement a torque control routine on a selected wheel by generation and application of a braking force on the wheel. The routine is initiated at step 241 and at 242, minimum and maximum acceptable wheel torque values $\tau_{min}$ and $\tau_{max}$ are calculated for the selected wheel according to the following relationship:

$$\tau_{max} = \mu * F * R_t$$

$$\tau_{min} = -(\mu * F * R_t)$$

where $\mu$ is the estimated coefficient of friction of the road surface, F is the normal force being applied to the selected wheel, and $R_t$ is the loaded tire radius of the selected wheel.

At 243, wheel torque value $\tau_t$ of the selected wheel is compared against the minimum and maximum acceptable wheel torque values $\tau_{min}$ and $\tau_{max}$ to determine if the wheel torque value $\tau_t$ is within an acceptable range for driveability, safety and within the overall capabilities of the braking and powertrain actuators of the vehicle. If at 243, $\tau_t$ is found to be greater than $\tau_{max}$ or less than $\tau_{min}$ then at 244, $\tau_t$ is limited by reducing it or increasing it by a value which places the value of $\tau_t$ within the range established by $\tau_{min}$ and $\tau_{max}$. At 245, a braking force corresponding to $\tau_t$ is calculated and a representative signal is transmitted to brake steer controller 108 which generates a braking force on the selected wheel which corresponds to wheel torque value $\tau_t$.

Figure 3A:
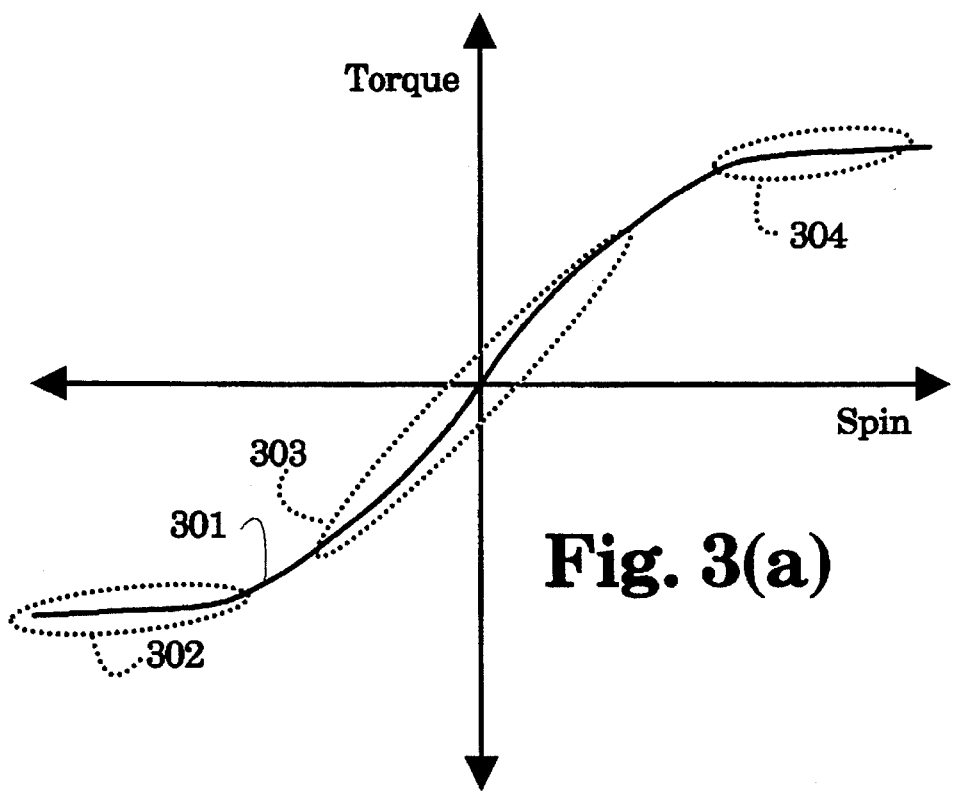
FIGS. 3(a) and 3(b) are graphical illustrations of regions of vehicle operation in which a preferred embodiment operates.
Figure 3B:
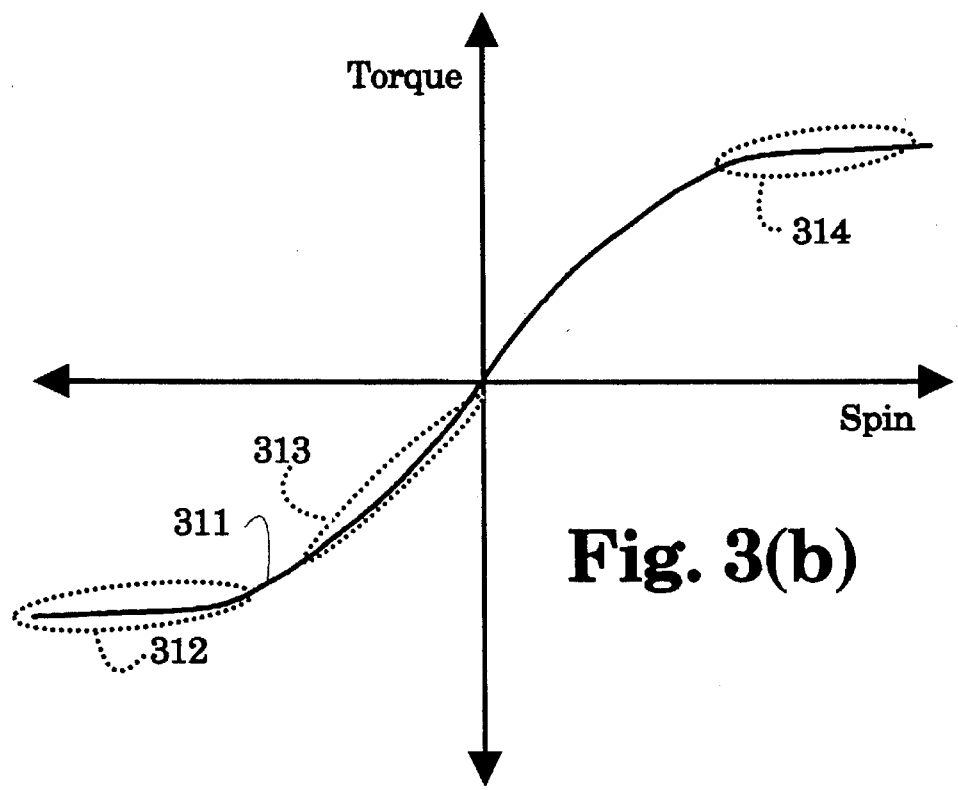

FIGS. 3(a) and 3(b) of the drawings show regions of operation of a preferred embodiment for different vehicle torque and spin values. FIG. 3(a) shows regions of operation, 302, 303 and 304, of a preferred embodiment on the driven wheels of a vehicle operating over the torque and spin regions designated by curve 301, and FIG. 3(b) shows regions of operation 312, 313, 314, of a preferred embodiment on the non-driven wheels of a vehicle operating over the torque and spin regions designated by curve 311. As shown in FIGS. 3(a) and 3(b), positive torque and spin values indicate a vehicle under acceleration, and negative torque and spin values indicate a vehicle under deceleration. In regions 302 and 312, when the vehicle is under heavy deceleration, a preferred embodiment utilizes skid control to control skidding of the driven and non-driven wheels. In region 303, when the vehicle is under moderate deceleration, at a constant speed or under moderate acceleration, a preferred embodiment utilizes torque control to control the driven wheels. In region 313, when the vehicle is under moderate deceleration, or at a constant speed, a preferred embodiment utilizes torque control to control the non-driven wheels. As can be seen, the region of operation for applying torque control is advantageously limited to deceleration for non-driven wheels while extending into acceleration for driven wheels without introducing excessive spin or skid. Finally, at region 304, when the vehicle is under heavy acceleration, spin control is utilized to control spinning of the driven wheels.

Figure 4:
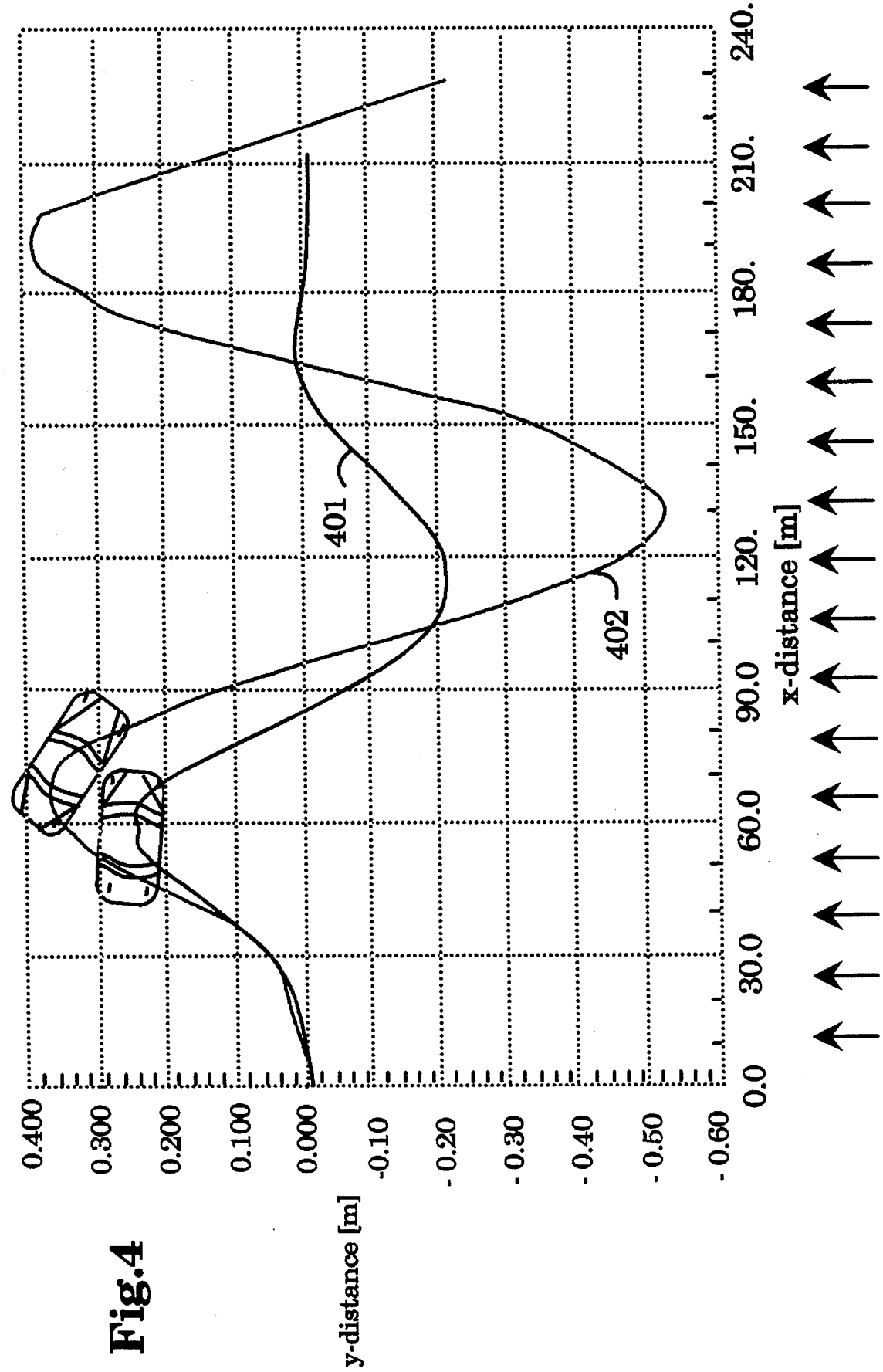
FIG. 4 is a graphical illustration of the response of a vehicle utilizing the principles of the invention.

FIG. 4 of the drawings shows the simulated response of a vehicle utilizing the aforedescribed system and of a conventional vehicle. In FIG. 4, a vehicle utilizing the aforedescribed system is shown at 401 and a conventional vehicle is shown at 402. The x (horizontal) and y (vertical) axes of FIG. 4 show respectively a forward and lateral distance in meters traveled by a vehicle. The arrows shown along the x-axis designate the direction of a wind with a velocity of five meters per second. As can be seen from FIG. 4, a vehicle utilizing the aforedescribed system experiences less lateral travel than the conventional vehicle on ice while encountering sudden wind gust.

It is to be understood that the specific mechanisms and techniques which have been described are merely illustrative of one application of the principles of the invention. Numerous modifications may be made to the methods and apparatus described without departing from the true spirit and scope of the invention.

What is claimed is:

1. A method of controlling vehicle directional stability and the traction of one or more wheels of said vehicle being driven over a surface, said vehicle having at least a pair of driven wheels, said method comprising in combination, the steps of:
   (a) generating a rotational velocity value indicative of the rotational velocity of said vehicle;
   (b) selecting, as a function of said rotational velocity value, from the wheels of said vehicle, a first pair of wheels to be controlled by application of a braking force upon said wheels, said pair of wheels both existing on the same side of said vehicle;
   (c) comparing said rotational velocity value to a predefined rotational velocity range indicative of a range of acceptable rotational velocity values;
   (d) responding to said rotational velocity value being outside of said rotational velocity range by generating a wheel torque value which is indicative of a braking force to be applied independently of driver initiated braking to one of said first pair of wheels;
   (e) determining if either of said driven wheels is spinning and responding to the spinning of either of said driven wheels by generating a wheel torque value indicative of a braking force to be applied to the spinning wheel; and
   (f) determining if either of said driven wheels is skidding and responding to the skidding of either of said driven wheels by generating a braking adjustment value indicative of an amount by which a braking force being applied to said skidding wheel is to be modulated to reduce skidding of said wheel.

2. The method as set forth in claim 1 comprising the additional step of responding to said rotational velocity being outside of said rotational velocity range by generating a braking force which is indicative of a braking force to be applied to the other wheel of said first pair of wheels.

3. The method as set forth in claim 1 wherein the step of responding to said rotational velocity being outside of said rotational velocity range comprises the steps of:
generating said wheel torque value as a function of the rotational velocity of said vehicle;
calculating, as a function of an estimated coefficient of road surface friction, a minimum value and a maximum value said minimum value and said maximum value defining a range of wheel torque values which may be applied to one of said first pair of wheels;
comparing said wheel torque value to said range of wheel torque values; and
limiting said wheel torque value if it is outside of said range of wheel torque values to bring said wheel torque value within said range of wheel torque values.

4. The method as set forth in claim 3 wherein the vehicle includes an electronically controlled throttle which controls the amount of power generated from an engine of said vehicle, and the method comprises the additional step of increasing the wheel torque value of a driven wheel, which is not spinning, by generating a value to be used by said electronically controlled throttle which is indicative of an increased amount of torque to be applied to said wheel which is not spinning.

5. The method as set forth in claim 4 wherein the rotational velocity range is generated from a model of a coasting vehicle on a surface with at least an estimated coefficient of friction.

6. The method as set forth in claim 4 wherein the rotational velocity range is generated from a model based on a road surface having a high coefficient of friction.

7. The method as set forth in claim 4 wherein the rotational velocity range is generated from a model which emulates four-wheel steering based on an estimated coefficient of friction.

8. The method as set forth in claim 3 wherein the step of generating a rotational velocity value indicative of the rotational velocity of said vehicle comprises the step of generating a vehicle torque value, which is indicative of a torque required to bring said rotational velocity value within a predefined range, comparing said vehicle torque value to a minimum vehicle torque value, and performing steps (b)–(f) if said vehicle torque value is greater than said minimum vehicle torque value.

9. A method of controlling vehicle directional stability and the traction of wheels of said vehicle, which is being driven over a surface, said method comprising in combination, the steps of:

(a) generating a rotational velocity value indicative of the rotational velocity of said vehicle;

(b) selecting, as a function of the rotational velocity value, from the wheels of said vehicle, a first pair of wheels to be controlled by application of a braking force upon said wheels, said pair of wheels both existing on the same side of said vehicle;

(c) comparing said rotational velocity value to a predefined rotational velocity range indicative of a range of acceptable rotational velocity values; and (d) responding to said rotational velocity value being outside of said rotational velocity range by,
for each driven wheel of said vehicle, determining if said wheel is skidding and responding to skidding of said wheel by changing braking force applied to said wheel; and
for all wheels of said vehicle, determining if said wheel is one of said first pair of wheels and if so, then generating a wheel torque value which is indicative of a braking force to be applied independently of driver initiated braking to said wheel, calculating, as a function of an estimated coefficient of road surface friction, a minimum wheel torque value and a maximum wheel torque value, said minimum wheel torque value and said maximum wheel torque values together defining a range of wheel torque values which may be applied to one of said first pair of wheels, comparing said wheel torque value to said minimum wheel torque value and to said maximum wheel torque value, and increasing said wheel torque value to a value substantially equal to said minimum wheel torque value if said wheel torque value is less than said minimum wheel torque value, and decreasing said wheel torque value to a value substantially equal to said maximum wheel torque value if said wheel torque value is greater than said maximum wheel torque value.

10. The method as set forth in claim 9 comprising the further step of, for each driven wheel of said vehicle, before determining if said wheel is skidding, determining if said wheel is spinning and responding to spinning of said wheel by reducing spinning of said wheel power applied to said wheel from said engine, and responding to said wheel not spinning by determining if said wheel is skidding.

11. The method as set forth in claim 9 wherein the step of generating a rotational velocity value indicative of the rotational velocity of said vehicle comprises the step of generating a vehicle torque value, which is indicative of a torque required to bring said rotational velocity value within a predefined range, comparing said vehicle torque value to a minimum vehicle torque value, and performing steps (b)–(d) if said vehicle torque value is greater than said minimum vehicle torque value.

* * * * *